United States Patent [19]
Delfosse

[11] 3,798,047

[45] Mar. 19, 1974

[54] PIGMENT FOR COATING PAPER AND MANUFACTURE THEREOF

[75] Inventor: Pierre Delfosse, Paris, France

[73] Assignee: Omya S.A., Paris, France

[22] Filed: Dec. 9, 1971

[21] Appl. No.: 206,255

[52] U.S. Cl. .............................. 106/306, 106/288 B
[51] Int. Cl. .............................................. C09c 1/02
[58] Field of Search ................. 106/306, 288 B, 309

[56] References Cited
UNITED STATES PATENTS
1,984,173  12/1934  Champion........................ 106/306
2,435,600  2/1948  Rafton .............................. 106/306

FOREIGN PATENTS OR APPLICATIONS
1,223,102  2/1971  Great Britain ..................... 106/306

*Primary Examiner*—Delbert E. Gantz
*Assistant Examiner*—James W. Hellwege

[57] ABSTRACT

A pigment for coating paper comprises an intimate mixture of 40-95 parts of natural calcium carbonate and 60-5 parts of satin white, at least 80 percent of the satin white being smaller than two microns. The pigment is prepared by grinding the components together, one of the components being in suspension.

7 Claims, No Drawings

PIGMENT FOR COATING PAPER AND MANUFACTURE THEREOF

The present invention relates to improvements in white pigments for coating paper and the manufacture thereof.

The most widely used paper coating pigment presently is kaolin because this pigment best meets the usual requirements for such pigments, which are excellent whiteness, great fineness (about 80 percent of the pigment particles being under two microns), great covering power or opacity, and an ability to acquire a shine on calendering.

However, the requirements for printing coated paper are becoming constantly more severe. More particularly, it is desirable to increase the printing speed while obtaining sharp and brilliant printed images, as well as to obtain coated paper useful for offset printing, i.e., a paper which has a good water resistance as well as a high speed of ink absorption.

It has also been proposed to use other pigments for coating paper, such as natural or precipitated calcium carbonates, which modify the structure of the coating and which thus permit the micro-porosity of the coating to be adjusted. Despite their whiteness and high covering power or opacity, however, precipitated calcium carbonates have been used to a limited extent only because of the high viscosity of their aqueous suspensions. As to the natural calcium carbonates, while they are cheaper than kaolin and precipitated calcium carbonates, their use has been limited because they are not white enough and they do not develop a shine on calendering.

It is the primary object of this invention to overcome the disadvantages of the known paper coating pigments and to provide such a pigment which gives prints of good quality while being relatively inexpensive.

The above and other objects are accomplished in accordance with the invention with an intimate mixture of about 95 to 40 parts, preferably 85 to 80 parts, by weight, of natural calcium carbonate and about 5 to 60 parts, preferably 15 to 20 parts, by weight, of satin white, at least about 80 percent, by weight, of the satin white having a particle size of less than about two microns. The natural calcium carbonate may be chalk or pure calcite.

As is known, satin white is a mixture of calcium sulfate and aluminum hydroxide produced by the co-precipitation of lime and aluminum sulfate in the presence of water.

According to another aspect of the present invention, this pigment may be produced either by preparing a suspension of satin white and grinding the suspension of satin white with natural calcium carbonate, or by grinding natural calcium carbonate in an aqueous suspension with an amount of aluminum sulfate sufficient to react only with a portion of the calcium carbonate to produce satin white until the above-indicated intimate mixture has been obtained.

While the whiteness of natural calcium carbonates is mediocre, they have good rheological properties. As to satin white, this is a pigment which produces very white coatings with a good finish. These coatings also are very opaque and smooth but the pigment requires a large amount of binder. The combination of the two components synergistically corrects their respective shortcomings.

Coatings of the pigment of this invention, constituted by an interlacing of fine needles of satin white crystals with almost spherical particles of calcium carbonate have a perfectly smooth surface, which facilitates rotogravure impressions, and an optimum micro-porosity. The physical structure of these coatings is superior to the lamellar structure of kaolin coatings while being at least equal thereto in gloss, brightness, smoothness and opacity. Therefore, these coatings give better printing properties.

It is preferred to use a natural calcium carbonate of soft structure, such as generally designated as chalk (for example, the sedimentary chalk of the Champagne and of the Paris basin in France, or other natural chalks). Chalk readily permits grinding to the desired fineness.

However, if desired, crystalline natural calcium carbonates, such so called vein calcite, may also be used, if desired.

According to one procedure, the pigment may be prepared by first preparing satin white, whose approximate formula is 6 $CaO.Al_2O_3 \cdot 3SO_3 \cdot 31 H_2O$, by reacting lime with aluminum sulfate in an aqueous medium or by directly reacting calcium carbonate with aluminum sulfate in an aqueous medium, and then grinding the suspension of satin white and the natural calcium carbonate.

It is also possible to prepare the intimate mixture directly and without first producing satin white. This may be done by grinding calcium carbonate in an aqueous suspension with a quantity of aluminum sulfate just sufficient to react with a portion of the calcium carbonate.

In accordance with one preferred feature, the grinding operation is effectuated in a microball mill, as disclosed in U.S. Pat. No. 2,581,414, dated Jan. 8, 1952, and No. 2,855,156, dated Oct. 7, 1958, and, if desired, in the presence of a dispersing agent, such as sodium polyacrylate, sodium polyphosphate, sodium silicate, and the like. Preferably, microballs of glass or quartzite are used to avoid discoloration of the pigment.

The following examples illustrate the present invention without in any way limiting its scope:

Example 1

The starting materials were chalk of the Champagne, which contained about 40 percent, by weight, of particles whose diameter in any direction was less than two microns, and a suspension of satin white having a solid concentration of 21 percent, by weight. The satin white had been prepared by reacting lime with aluminum sulfate in the presence of water. A concentration of about 25 percent, by weight, of aluminum sulfate was chosen in the preparation of the satin white to obtain optimum fineness. Also, to obtain a good dispersion and low viscosity, a dispersing agent was added to the suspension.

260 grams of the chalk and 200 grams of the satin white suspension were introduced into a "Perl Mill PM 1," manufactured by Drais Werke, Germany, which is a ball mill containing siliquartzite balls of one millimeter diameter. The mill consists essentially of a vertical cylindrical container holding a central agitator provided with rings at different levels.

Grinding was continued for about 20 minutes. Subsequently, the suspension was filtered to obtain the pigment. The product may be shipped as obtained from filtration or first dried at a temperature of less than about 105°C.

The pigment was applied in a thin coating on a black surface and its brightness was compared with that obtained with the same thickness of a kaolin coating. The respective brightness, measured by an Elrepho apparatus equipped with a blue filter which passes light having a wavelength between 4,300 and 4,600 A, were as follows:

Pigment of the Example: 50
Kaolin coating: 45

Thus, the pigment, which contained about 85 percent, by weight, of calcium carbonate and about 15 percent, by weight, of satin white, had a whiteness superior to that of the conventional kaolin coating. This pigment, while useful in other applications, is particularly advantageous for paper coatings since it also has excellent absorptivity for ink and, in suspension, has a viscosity lower than that of a kaolin suspension of the same concentration.

Example 2

This example illustrates an improved method of preparing the satin white component of the pigment by directly reacting calcium carbonate with aluminum sulfate in an aqueous medium.

200 grams of an aqueous suspension of 20 percent, by weight, of the chalk of Example 1 were introduced into the mill of Example 1, and 270 grams of an aqueous solution of aluminum sulfate containing 8.2 percent, by weight, of $Al_2O_3$ were added to the $CaCO_3$ suspension. The resultant reaction released carbonic gas which was removed. The pH of the reaction mixture was adjusted to 10 by adding milk of lime, and the mixture was ground for about an hour. The same result was obtained when the milk of lime was introduced into the suspension before the addition of the aluminum sulfate.

After grinding, sodium fluoride was added to precipitate the excess lime, and additional grinding for about 20 minutes was pursued. A dispersing agent was added to the aqueous mixture and an aqueous suspension containing about 15 to 20 percent, by weight, of satin white was obtained.

Tests showed the resultant product to have a fineness and covering power or opacity superior to that of satin white obtained by the reaction of aluminum sulfate and lime.

Example 3

This example illustrates the direct preparation of an intimate mixture of calcium carbonate and satin white without first producing the satin white.

100 grams of the chalk of Example 1, 28 grams of the aqueous aluminum sulfate solution of Example 2 and 300 grams of water were introduced into the mill of Example 1. The grinding operation (a total of about 80 minutes) was that of Example 2.

The resultant pigment contained about 85 percent, by weight, of calcium carbonate and 15 percent, by weight, of satin white.

In the same brightness test as in Example 1, the following results were obtained:

Directly produced pigment 60
Pigment of Example 1 50
Kaolin 45

Thus, the directly produced pigment proved to have the best brightness characteristics. In addition, the direct method is particularly simple, and the use of $CaCO_3$ instead of lime produces considerable economies in manufacture.

What is claimed is:

1. A process of preparing a pigment for coating paper, comprising the steps of preparing a suspension of satin white and grinding the suspension of satin white with natural calcium carbonate until at least about 80 percent, by weight, of the resulting pigment has a particle size of less than about two microns, the amount of satin white and calcium carbonate being such that the resultant intimate mixture thereof comprises about 95 to 40 parts, by weight, of calcium carbonate and 5 to 60 parts, by weight, of satin white.

2. The process of claim 1, wherein the suspension of satin white is prepared by grinding natural calcium carbonate with aluminum sulfate in the presence of water.

3. The process of claim 1, wherein the grinding is effectuated in a microball mill.

4. The process of claim 3, wherein the grinding is effectuated in the presence of a dispersing agent.

5. A process of preparing a pigment for coating paper, comprising the steps of grinding natural calcium carbonate in an aqueous suspension with an amount of aluminum sulfate sufficient to react only with a portion of the calcium carbonate to produce satin white until an intimate mixture of the natural calcium carbonate and satin white is obtained and at least 80 percent, by weight, of the resulting pigment has a particle size of less than about two microns, the amounts of calcium carbonate and aluminum sulfate being such that the intimate ground mixture thereof comprises about 95 to 40 parts, by weight, of calcium carbonate and 5 to 60 parts, by weight, of satin white.

6. The process of claim 5, wherein the grinding is effectuated in a microball mill.

7. The process of claim 5, wherein the grinding is effectuated in the presence of a dispersing agent.

* * * * *